(12) United States Patent
Basam et al.

(10) Patent No.: US 11,572,232 B2
(45) Date of Patent: Feb. 7, 2023

(54) SYSTEMS AND METHODS FOR AUTOMATICALLY RECONFIGURING A BUILDING STRUCTURE

(71) Applicant: eBay Inc., San Jose, CA (US)

(72) Inventors: Dileep Kumar Basam, San Jose, CA (US); Andrew Chalkley, San Jose, CA (US); Ethan Benjamin Rubinson, Santa Clara, CA (US); Jean-David Ruvini, Mountain View, CA (US); Bindia Saraf, Sunnyvale, CA (US); Qiaosong Wang, San Jose, CA (US)

(73) Assignee: eBay Inc., San Jose, CA (US)

( * ) Notice: Subject to any disclaimer, the term of this patent is extended or adjusted under 35 U.S.C. 154(b) by 3 days.

(21) Appl. No.: 17/498,107

(22) Filed: Oct. 11, 2021

(65) Prior Publication Data
US 2022/0025638 A1    Jan. 27, 2022

Related U.S. Application Data

(63) Continuation of application No. 16/568,015, filed on Sep. 11, 2019, now Pat. No. 11,167,925.

(51) Int. Cl.
*B65G 1/137* (2006.01)
*G05B 15/02* (2006.01)
(Continued)

(52) U.S. Cl.
CPC ............ *B65G 1/1373* (2013.01); *E04B 1/343* (2013.01); *E04B 1/34861* (2013.01);
(Continued)

(58) Field of Classification Search
CPC ....... B65G 1/1373; G05B 15/02; G06F 30/13; G06F 2111/20; E04B 1/343; E04B 1/34861; E04B 1/34869
See application file for complete search history.

(56) References Cited

U.S. PATENT DOCUMENTS 9,176,492 B2    11/2015   Sandler
10,248,089 B2    4/2019   Brun et al.
(Continued)

FOREIGN PATENT DOCUMENTS

EP    3511268 A1    7/2019
JP    H02158501 A   6/1990
(Continued)

OTHER PUBLICATIONS

Non Final Office Action received for U.S. Appl. No. 16/568,015, dated Jun. 21, 2021, 9 pages.
(Continued)

*Primary Examiner* — Kyle O Logan
(74) *Attorney, Agent, or Firm* — FIG. 1 Patents

(57) ABSTRACT

Techniques for automatically modulating a physical configuration of a reconfigurable building structure. A reconfigurable building structure may be constructed of physical elements that are movable with respect to one another to facilitate actuating the reconfigurable building structure between a plurality of different physical configurations. The physical configuration of a reconfigurable building structure may be adjusted to accommodate for physical dimensions of an item that is going to be moved into the reconfigurable building structure. For example, a spacing between two shelves may be expanded in response to an order being placed for a large item. In this way, when the item is delivered to a physical address associated with the reconfigurable building structure, various physical characteristics of the reconfigurable building structure may have already been modulated to accept the item.

20 Claims, 9 Drawing Sheets

(51) Int. Cl.
*G06F 30/13* (2020.01)
*E04B 1/343* (2006.01)
*E04B 1/348* (2006.01)
*G06F 111/20* (2020.01)

(52) U.S. Cl.
CPC .......... *E04B 1/34869* (2013.01); *G05B 15/02* (2013.01); *G06F 30/13* (2020.01); *G06F 2111/20* (2020.01)

(56) References Cited

U.S. PATENT DOCUMENTS

| | | |
|---|---|---|
| 11,167,925 B2 | 11/2021 | Basam et al. |
| 2019/0210818 A1 | 7/2019 | Dautz et al. |
| 2019/0256287 A1 | 8/2019 | Bourke |
| 2021/0070547 A1 | 3/2021 | Basam et al. |

FOREIGN PATENT DOCUMENTS

| | | |
|---|---|---|
| KR | 20030022254 A | 3/2003 |
| WO | 2015/164264 A1 | 10/2015 |

OTHER PUBLICATIONS

Notice of Allowance received for U.S. Appl. No. 16/568,015, dated Aug. 10, 2021, 9 pages.
Extended European Search Report received for European Patent Application No. 20191857.0 dated Feb. 10, 2021, 7 pages.

SYSTEMS AND METHODS FOR AUTOMATICALLY RECONFIGURING A BUILDING STRUCTURE

RELATED APPLICATIONS

This application is a continuation of and claims priority to U.S. patent application Ser. No. 16/568,015, filed Sep. 11, 2019, entitled "Systems And Methods For Automatically Reconfiguring A Building Structure", the entire disclosure of which is hereby incorporated by reference herein in its entirety.

BACKGROUND

Conventional building structures are constructed of physical elements that are statically located with respect to one another. For example, an entrance hallway of a typical apartment building has a fixed width that is defined by a distance between two opposing walls. Here, the width of the hallway is fixed in the sense that it cannot be adjusted without undertaking demolition and reconstruction of the opposing walls. As another example, a shelf-space within a typical kitchen pantry has a fixed height that is defined by a distance between two vertically adjacent shelves—each resting on respective shelf pegs. Here, adjusting the height of the shelf-space may be accomplished only by removing the shelf pegs and replacing them at a different height within the kitchen pantry. In either case, adjusting the physical configuration of the building structure (e.g. the hallway or the kitchen pantry) can be accomplished only through manual and laborious construction methods.

Online commerce and the frequency with which businesses and individuals receive parcel deliveries has grown tremendously in recent years. Unfortunately, the static nature in which conventional building structures are built renders them ill-suited for accommodating the various sizes of items being delivered in association with the building structures. For example, although the fixed width of the above-mentioned entrance hallway may be suitable for people to walk through, this fixed width may be too small to accommodate a delivery of a large piece of furniture (e.g., a couch or a piano). As another example, the height of the above-mentioned shelf-space may be large enough to store items up to a certain size but may be unable to store larger items that are periodically delivered. Thus, the static nature in which conventional building structures are built results in inefficiencies with respect to accommodating varying physical dimensions of items as they are delivered to a physical address.

It is with respect to these and other considerations that the following disclosure is made.

SUMMARY

This disclosure provides techniques for automatically modulating a physical configuration of a reconfigurable building structure. In some embodiments, the physical configuration of the reconfigurable building structure may be adjusted for the specific purpose of accommodating physical dimensions of an item that is going to be moved into the reconfigurable building structure (e.g., upon delivery of the item). Generally described, a reconfigurable building structure may be constructed of physical elements that are movable with respect to one another to facilitate actuating the reconfigurable building structure between a plurality of different physical configurations. As an example, individual ones of these movable elements may be installed on tracks that enable these movable elements to slide back and forth. Upon receiving an indication that an item is going to be physically moved into the reconfigurable building structure, a determination may be made as to one or more physical dimensions of the item (e.g., a height and/or width of the item). Then, based on the determined physical dimensions of the item, the reconfigurable building structure may be actuated into an appropriate physical configuration in order to efficiently accommodate physical movement and/or placement of the item into at least a portion of the reconfigurable building structure. In this way, a physical configuration of the reconfigurable building structure may continually adapt as items of various physical dimensions are delivered—thereby preventing the occurrence of situations in which a particular item that is delivered in association with the reconfigurable building structure is incapable of being physically moved into the reconfigurable building structure.

As an illustrative physical embodiment, a reconfigurable building structure may be in the form of a kitchen pantry having a plurality of movable shelves (i.e., movable elements) that are installed on tracks to facilitate vertical actuation of the shelves with respect to one another. It will be appreciated that the height of a particular shelf-space (e.g., usable volume between shelves) will be defined by the distance between a top surface of a first shelf and a bottom surface of a second shelf that is positioned on the tracks above the first shelf. In this specific example, the height of the particular shelf-space may be increased or decreased by actuating the first shelf away from or toward the second shelf, respectively. The reconfigurable building structure may be communicatively coupled to a controller for determining an appropriate physical configuration for accommodating an item that is to be physically moved into the reconfigurable building structure. For example, the controller may receive order data associated with an online order that has been placed for an item of a specific type (e.g., a can of food) that is typically stored within a kitchen pantry. Then, the controller may determine item dimension data that defines physical dimensions of the item (e.g., a height of the can, a width of the can, etc.).

Based on the item dimension data, the controller may identify a particular physical configuration of the kitchen pantry that is suitable for accommodating physical movement of the item (e.g., the can of food) into the particular shelf-space. For example, the controller to determine that a current height of the particular shelf-space is too small to fit the item. The controller may further determine a particular physical configuration in which the height of the particular shelf-space is large enough to fit the item. Ultimately, the controller may cause actuation of one or both of the first shelf or second shelf to adjust the physical dimensions of the particular shelf-space to accommodate for storage of the item within the particular shelf-space. More specifically, the controller may actuate the kitchen pantry into the particular physical configuration in which the height of the particular shelf-space is large enough to fit the item. In this way, as items of various physical dimensions are delivered, a physical configuration of a reconfigurable building structure (e.g., in this example the kitchen pantry) may be automatically modulated for the specific purpose of accommodating these various physical dimensions of the items (e.g., a can of food).

As an illustrative process implementation, a system identifies a multitude of movable elements that define various surfaces of a reconfigurable building structure. Exemplary reconfigurable building structures include, but are not limited to, specific portions of a building (e.g., an entryway, a closet, a pantry, a build-in bookshelf, a garage, etc.) that are constructed of movable elements (e.g., walls, shelves, doors, etc.). Individual ones of these movable elements are specifically configured to be actuated between multiple different positions. For example, in an embodiment in which a movable element is a wall that forms an entryway to a building, a particular side of the wall may be affixed to a hinge so that entire wall may be actuated to swing open—thereby increasing one or more physical dimensions of the entryway to the building. As another example, in an embodiment in which a movable element is a shelf that forms a shelf-space of a garage storage rack or a kitchen pantry, the shelf may be coupled to tracks so that the entire shelf can be actuated up and down as desired for the specific purpose of controllably modulating a height of the shelf-space.

In this illustrative process implementation, the system may also receive configuration data that defines multiple physical configurations of the reconfigurable building structure. In general terms, individual ones of these multiple physical configurations correspond to different combinations of the relative positions between the movable elements that have been identified by the system. For example, a first physical configuration of the reconfigurable building structure may correspond to a first positional combination in which two particularly identifiable movable elements are spaced a first distance apart, whereas a second physical configuration may correspond to a second positional combination in which these two particularly identifiable movable elements are spaced a second distance apart that is farther than the first distance. In such an example, these two particularly identifiable movable elements may be actuated from the first positional combination into the second positional combination in order to enable an item of a particular size (e.g., a particular height, a particular width, etc.) to fit between these two particularly identifiable movable elements. For example, if the movable elements are shelves, then these shelves may be actuated into the second positional combination to enable a large item to fit into a particular shelf-space for storage purposes.

Prior to modulating the physical configuration of the reconfigurable building structure, the system may receive an indication that an item is going to be physically moved into the reconfigurable building structure. As an example, the system might receive order data that is generated when an online order is placed for the item (e.g., via a smartphone app). Based on the item being included within a specific category of items that in known (or presumed) to be stored in the reconfigurable building structure, the system may determine that the item is going to be moved into the reconfigurable building structure upon receipt (i.e., when delivered to a physical address associated with the reconfigurable building structure). To illustrate this point, suppose that the reconfigurable building structure is a kitchen pantry and that the item for which the online order has been placed is included within a nonperishable canned foods category. Further suppose that setup parameters associated with the reconfigurable building structure indicate that upon receipt of nonperishable canned foods at a user's residence (e.g., the physical address associated with the reconfigurable building structure), these types of items are in all (or nearly all instances) placed into the kitchen pantry for storage. In this specific but nonlimiting example, receiving the order data for the item that is included within the nonperishable canned foods category may serve as the indication that the item is to be physically moved into the reconfigurable building structure upon delivery.

The system may also determine item dimension data that defines one or more physical dimensions of the item. For example, under the circumstances in which the indication is simply receiving the order data corresponding to the online order, the system may analyze the order data to identify product specifications that include the one or more physical dimensions of the item. Based on the item dimension data, the system may determine a specific physical configuration of the reconfigurable building structure that is suitable for accommodating physical movement of the item into a portion of the reconfigurable building structure. For example, the system may determine a specific physical configuration of a kitchen pantry in which a particular shelf of the kitchen pantry has a height that is tall enough for the item to be physically placed onto the particular shelf for storage.

Ultimately, responsive to receiving the indication that the item is to be physically moved into the reconfigurable building structure, the system may cause actuation of at least some of the movable elements that define the various surfaces of the reconfigurable building structure. More specifically, the system may actuate various movable elements (e.g., shelves, walls, etc.) of the reconfigurable building structure into the specific physical configuration that has been determined to be suitable for accommodating physical movement of the item into the portion (e.g., the particular shelf of the kitchen pantry) of the reconfigurable building structure.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
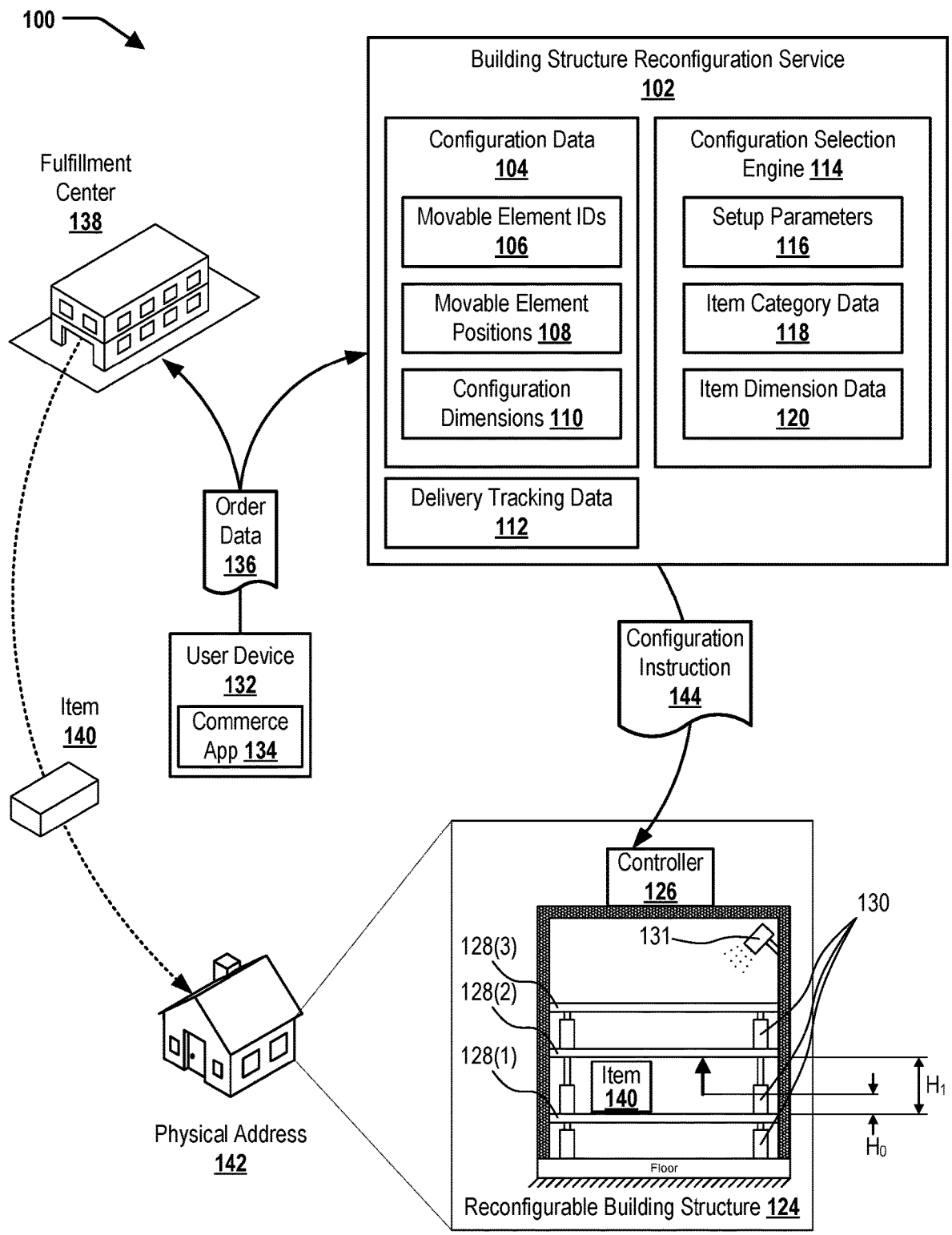
FIG. 1 illustrates an exemplary system for automatically modulating a physical configuration of a reconfigurable building structure to accommodate for physical dimensions of an item that is going to be moved into the reconfigurable building structure.

The following Detailed Description describes techniques for automatically modulating (i.e., controllably adjusting) a physical configuration of a reconfigurable building structure based on a variety of factors. Generally described, a reconfigurable building structure may be constructed of physical elements that are movable with respect to one another to facilitate actuating the reconfigurable building structure between a plurality of different physical configurations. As an example, individual ones of these movable elements may be installed on tracks that enable these movable elements to slide back and forth. In this way, a physical configuration of the reconfigurable building structure may continually adapt based on a variety of factors.

In some embodiments, the physical configuration of a reconfigurable building structure may be adjusted to accommodate for physical dimensions of an item that is going to be moved into the reconfigurable building structure. For example, a system may receive order data indicating that an item is going to be delivered to a physical address in which the reconfigurable building structure is installed. Based on the item belonging to a specific category of items that are typically stored within the reconfigurable building structure (e.g., a kitchen pantry) at the physical address, the system may modulate the physical configuration of the reconfigurable building structure to accommodate for the specific physical dimensions of the item. In this way, upon the item being delivered to the physical address, the reconfigurable building structure may have already been adjusted to facilitate efficient storage of the item.

In some embodiments, the physical configuration of a reconfigurable building structure may be adjusted to modulate a physical placement of an item with respect to a surrounding environment. For example, a system may receive item placement data defining parameters for raising and/or lowering a shelf within a grocery store isle at various times throughout a day. In this way, the system may automatically adjust a physical product placement for one or more specific types and/or brands of goods with respect to customers whom are shopping at the grocery store. For example, a first brand of a carbonated beverage (e.g., soda) may be supported on a shelf at a "premium" product placement height for a first half of a day but may then be raised upward to enable a second brand's carbonated beverage to be moved up into the "premium" product placement height for a remainder of the day.

Although a variety of physical forms are contemplated herein, exemplary reconfigurable building structures are typically constructed of physical elements that are movable with respect to one another to facilitate actuating the reconfigurable building structure between a plurality of different physical configurations. For example, the movable elements may be installed on tracks that enable the movable elements to slide back-and-forth. As another example, the movable elements may be installed on hinges that enable the movable elements to swing clockwise-and-counterclockwise. A system that controls the current physical configuration of a particular reconfigurable building structure may continually or periodically make a determination as to an appropriate physical configuration for that particular reconfigurable building structure based on a variety of relevant factors—which may fluctuate or vary over time. For example, a reconfigurable kitchen pantry may be instructed to adjust a height of a particular shelf-space in order to accommodate for a height-dimension of an item that is going to be delivered in the near future. As another example, a reconfigurable grocery store shelf may be instructed to adjust a height at which a particular brand and/or type of good is displayed depending on factors such as what the current time of day is, whether a higher bid has been placed for "premium" product placement, etc. Thus, as various relevant factors change over time, the reconfigurable building structures described herein may be periodically actuated into an appropriate physical configuration. In this way, a physical configuration of the reconfigurable building structure may continually adapt as the various relevant factors change over time.

Turning now to FIG. 1, illustrated is an exemplary system 100 for automatically modulating a physical configuration of a reconfigurable building structure 124 to accommodate for physical dimensions of an item 140 that is going to be moved into the reconfigurable building structure 124. The specific scenario that is illustrated in FIG. 1 corresponds to one or more physical characteristics (e.g., dimensions) of the reconfigurable building structure 124 being adjusted so that an item 140 that has been ordered for delivery to a physical address 142 can be physically moved into a portion of the reconfigurable building structure 124 upon being delivered. As a specific example, the reconfigurable building structure 124 may be a kitchen pantry having one or more movable shelves that can be actuated for the purpose of controlling a height of a shelf-space (e.g., so that a large can of food can fit in the shelf-space for storage). As another example, the reconfigurable building structure 124 may be an entrance hallway having one or more walls that can be actuated to control a width of the entrance hallway (e.g., so that a couch can be carried through the entrance hallway into a living space).

The specifically illustrated scenario of FIG. 1 is shown for exemplary purposes only due to being suitable to adequately convey various concepts of the technologies described herein. This specific scenario is not intended to be limiting and it should be immediately apparent from both of the foregoing and the following discussion that many other scenarios are within the scope of the present disclosure.

As illustrated, the system 100 includes a building structure reconfiguration service 102 that operates a configuration selection engine 114 to generate configuration instruction(s)

144. The configuration instruction(s) 144 are generated for the specific purpose of modulating a physical configuration of a reconfigurable building structure 124. Here, the building structure reconfiguration service 102 is illustrated as an external service that communicates with the reconfigurable building structure 124 via a controller 126. The controller 126 may be a general-purpose or special-purpose computer that is installed within the reconfigurable building structure 124. As illustrated, the building structure reconfiguration service 102 may operate as a cloud-based service that periodically transmits configuration instructions 144 over one or more networks to the reconfigurable building structure 124. Alternatively, the building structure reconfiguration service 102 may be a logical component that is executed, by the controller 126, locally at the reconfigurable building structure 124. In some embodiments, individual configuration instructions 144 may define one or more parameters associated with how the reconfigurable building structure 124 is to move from one configuration into another configuration. As a specific but non-limiting example, a configuration instruction 144 may define one or more of an acceleration with which to move a particular movable element (e.g., accelerate a shelf at 1 m/s$^2$) from a resting state to a steady state velocity and/or a deceleration with which to slow the particular movable element from the steady state velocity back to a resting state in an new physical configuration.

In the illustrated embodiment, the building structure reconfiguration service 102 stores (or otherwise has access to) configuration data 104 that defines various physical configurations associated with the reconfigurable building structure 124. In plain terms, individual ones of these physical configurations (e.g., into which the reconfigurable building structure 124 may be actuated) correspond to specific relative positions between various movable elements 128 of the reconfigurable building structure 124. For example, as illustrated, the reconfigurable building structure 124 includes a first movable element 128(1), a second movable element 128(2), and a third movable element 128(3). As further illustrated, the reconfigurable building structure 124 includes a plurality of actuators 130 that may be activated (e.g., caused to change in size and/or shape) by the controller 126 to adjust a relative position between two or more of the movable elements 128. Although the actuators 130 are illustrated in FIG. 1 to resemble hydraulic cylinder type actuators, the actuators 130 may take any suitable form and utilize any suitable energy source (e.g., hydraulic, pneumatic, electric, magnetic, and/or mechanical).

The configuration data 104 may define movable element identifiers (IDs) 106 that uniquely identify individual ones of the movable elements 128. For example, a first movable element ID may be uniquely assigned to the first movable element 128(1), a second movable element ID may be uniquely assigned to the second movable element 128(2), and so on. The movable element IDs 106 may be usable by the building structure reconfiguration service 102 and/or the controller 126 to monitor a current physical configuration of the reconfigurable building structure 124. For example, the building structure reconfiguration service 102 may maintain a record of how specific actuators 130 that correspond to one or more specific movable element IDs have been caused to change in shape and/or size. Then, based on this record of how the specific actuators 130 have changed in shape and/or size, the building structure reconfiguration service 102 may ascertain the current physical configuration of the reconfigurable building structure 124. As another example, individual ones of the actuators 130 may be equipped with linear and/or rotary encoders to track a speed and a position of a motor shaft. Here, based on a current reading from one or more encoders, the building structure reconfiguration service 102 may ascertain the current physical configuration of the reconfigurable building structure 124.

The configuration data 104 may also define movable element positions 108 for individual ones of the movable elements 128. In plain terms, the movable element positions 108 are discrete positions and/or ranges of positions into which individual ones of the movable elements 128 may be controllably actuated. The movable element positions 108 for an individual movable element 128 may be defined with respect to one or more other movable elements 128. For example, in the illustrated scenario, one or more discrete movable element positions 108 or a range of movable element positions may be defined for the second movable element 128(2) with respect to the first movable element 128(1). In such an example, these movable element position(s) 108 are indicative of a height for a shelf-space that is bound by a top surface of the first movable element 128(1) and a bottom surface of the second movable element 128(2). Additionally, or alternatively, the movable element positions 108 for an individual movable element 128 may be defined with respect to one or more static or non-movable components of the reconfigurable building structure 124. For example, in the illustrated scenario, one or more movable element positions 108 may be defined for the first movable element 128(1) with respect to a floor.

The configuration data 104 may also define configuration dimensions 110 associated with various physical configurations of the reconfigurable building structure 124. The configuration dimensions 110 define physical dimensions between surfaces of the reconfigurable building structure 124. Implementations of the techniques described herein controllably modulate these physical dimensions between surfaces of the reconfigurable building structure 124 by actuating one or more movable elements 128 into different ones of the movable element positions 108. As a specific example, the configuration dimensions 110 may define a height of the third movable element 128(3) above a floor when each of the first movable element 128(1) through the third movable element 128(3) are actuated into specific positions as defined within the movable element positions 108. Then, if some particular condition is identified (e.g., an order is placed for a large item) and this condition indicates that causing the third movable element 128(3) to be located at the defined height above the floor is appropriate, then a configuration instruction 144 may be sent to the controller 126 to activate the actuators 130 as needed to reposition the third movable element 128(3) to this height.

In various embodiments, the configuration selection engine 114 stores or otherwise has access to setup parameters 116 that may be defined in order to control how the reconfigurable building structure 124 is to be modulated through its available physical configurations based on various relevant factors or conditions. The setup parameters 116 may be defined by a manufacturer of the reconfigurable building structure 124. Additionally, or alternatively, the setup parameters 116 may be defined by an end user that is utilizing the reconfigurable building structure 124 at the physical address 142 (e.g., home residence, commercial building, etc.). The setup parameters 116 may define one or more preferred physical configurations for the reconfigurable building structure 124 and may further define specific conditions under which the building structure reconfiguration service 102 is to modulate the reconfigurable building structure 124 into specific ones of the one or more preferred physical configurations.

As a specific but non-limiting example, suppose that setup parameters 116 that are defined in association with the reconfigurable building structure 124 indicate that when a certain type of caustic cleaning agent is present at the physical address 142, the preferred storage location for this caustic cleaning agent is on top of the third movable element 128(3) at a height of seven feet off the ground (e.g., to keep the caustic agent away from children). Under these circumstances, upon detecting that a delivery of the caustic cleaning agent is about to occur (e.g., will occur within some threshold time frame), the configuration selection engine 114 may determine based on the setup parameters 116 that the third movable element 128(3) should be actuated to a height of seven feet off the ground. Then, based on this determination, the configuration selection engine 114 may analyze the configuration dimensions 110 to identify a suitable physical configuration in which the third movable element 128(3) is seven feet off the ground. Ultimately, the configuration selection engine 114 may then generate a configuration instruction 144 to actuate the reconfigurable building structure 124 into the identified physical configuration.

In some embodiments, the reconfigurable building structure 124 may have one or more sensors 131 installed therein in order to monitor various conditions associated with the reconfigurable building structure 124. The sensors 131 may include, but are not limited to, one or more cameras and/or Light Detection and Ranging (LiDAR) detection systems that are directed toward the reconfigurable building structure 124 and are usable to detect current conditions thereof. As a specific example, the sensors 131 may include a LiDAR detection system that is pointed at various shelf-spaces that are formed by the reconfigurable building structure 124. This LiDAR detection system to continuously and/or periodically detect the physical dimensions of items that are currently stored within the reconfigurable building structure 124. In this specific example, the information (e.g., sensor data) collected by the LiDAR detection system may be used by the configuration selection engine 114 to ensure that a selected physical configuration (e.g., into which the reconfigurable building structure 124 is to be modulated to accommodate for an item 140 that is going to be delivered) does not conflict with physical dimensions of items that are already being stored within the reconfigurable building structure 124. Furthermore, in the event that an item has been ordered (or is about to be ordered) that will not fit within the reconfigurable building structure 124 due to conflicts with items that are already being stored within the reconfigurable building structure 124, a notification may be sent to a user device 132 to inform a person of the identified conflict. For example, suppose that a reconfigurable building structure 124 is in the form of a kitchen pantry and that a specific portion of this kitchen pantry is designated for storing large jugs of cooking oil. Further suppose, that this portion is currently being used to store a maximum number of these large jugs of cooking oil. Under these circumstances, the building structure reconfiguration service 102 may communicate with the sensor(s) 131 to identify that the maximum number of these large jugs of cooking oil are already being stored—and therefore that there is no additional room within the specific portion of this kitchen pantry for any more jugs to be inserted. Here, if the building structure reconfiguration service 102 receives order data 136 indicating that an order has been placed for a jug of oil which cannot fit into the specific portion of the kitchen pantry, a pop-up style notification may be sent to the user device 132 to specifically inform a consumer (whom is generating the order) of the conflict. In this way, the consumer is provided with highly relevant information as to a current state of a reconfigurable building structure 124 at a time that facilitates the consumer to make informed purchasing decisions.

In various embodiments, the configuration selection engine 114 may store or otherwise have access to item category data 118 that defines types and/or categories of goods that are to be stored within the reconfigurable building structure 124 upon being delivered to the physical address 142. In this way, the building structure reconfiguration service 102 may identify when particular items have been ordered that will be stored within the reconfigurable building structure 124 upon being delivered to the physical address 142. Then, in response to identifying when such items will be delivered, the building structure reconfiguration service 102 may adjust the physical configuration of the reconfigurable building structure 124 accordingly. For example, suppose that the reconfigurable building structure 124 is a kitchen pantry that in its current physical configuration will not fit a large can that is scheduled to be delivered to the physical address 142. In this example, responsive to identifying that this scheduled delivery and the item dimensions, the building structure reconfiguration service 102 may modulate a physical configuration of the kitchen pantry (e.g., by raising and/or lowering shelves via the actuators 130) so that the large can will fit onto a particular shelf-space. In contrast, when other items are ordered that will also be delivered to the physical address 142 but which are not of the specific types and/or categories of goods that are to be stored within the reconfigurable building structure 124, the building structure reconfiguration service 102 may refrain from modulating a physical configuration of the reconfigurable building structure 124.

In some embodiments, the configuration selection engine 114 may utilize the sensor(s) 131 to observe how the reconfigurable building structure 124 is being used at the physical address 142 over a particular range of time. For example, the sensor(s) 131 may include a camera that generates images which may be analyzed by the configuration selection engine 114 to identify the specific types and/or categories of goods that are being stored within the reconfigurable building structure 124. Then, the configuration selection engine 114 may update the item category data 118 to include definitions for specific types and/or categories of items that are likely to be stored within the reconfigurable building structure 124. Additionally, or alternatively, the configuration selection engine 114 may update the item category data 118 to include definitions for specific types and/or categories of items that are unlikely to be stored within the reconfigurable building structure 124. Then, as various categories of items are ordered for delivery to the physical address 142, the building reconfiguration service 102 may determine whether a delivery of the ordered good warrants any sort of modulation of the physical configuration of the reconfigurable building structure 124.

In various embodiments, the configuration selection engine 114 may also store or otherwise have access to item dimension data 120 that defines physical dimensions for one or more items that are currently located within the reconfigurable building structure 124 and/or are scheduled for delivery to the reconfigurable building structure 124. For example, with respect to items that are currently located within the reconfigurable building structure 124, the configuration selection engine 114 may utilize the sensors to keep track of the quantity and/or physical dimensions of those items which are currently being stored within the reconfigurable building structure 124. As another example, and with respect to items that are scheduled for delivery to the reconfigurable building structure 124, the configuration selection engine 114 may analyze order data 136 associated with the item 140 to identify specifications for the item 140. These specifications may include, for example, weight, height, width, and so on.

With respect to the data flow scenario that is illustrated in FIG. 1, the building structure reconfiguration service 102 is shown to receive order data 136 that corresponds to an online order being placed for an item 140. In some instances, the order data 136 may be generated based on a user interacting with a commerce app 134 that is installed on a user device 132. An exemplary commerce app 134 may be a smart phone application that corresponds to a specific retailer. Such a smart phone application may provide a user with search functionality with respect to a product catalog of the specific retailer. Such a smart phone application may also store one or more forms of payment information (e.g., credit card numbers, etc.) to enable a user to quickly place orders for items to be delivered to the physical address 142.

As illustrated, in addition to being provided to the building structure reconfiguration service 102, the order data 136 may also be provided to a fulfillment center 138 upon being generated via the user device 132. The fulfillment center 138 may process the order data 136 appropriately to fulfill the order which has been placed. Processing the order data 136 may include, for example, identifying a particular item 140 that has been purchased and also a particular physical address 142 to which the particular item 140 is to be delivered. Then, the particular item 140 may be shipped from the fulfillment center 138 to the physical address 142 in accordance with one or more preferred delivery methods.

In some embodiments, receipt of the order data 136 may serve as an indication that the item 140 is going to be physically moved into the reconfigurable building structure 124. For example, the order data 136 may indicate that the particular item 140 that has been ordered belongs to a specific category of items that is known (or presumed) to be stored in the reconfigurable building structure 124. For illustrative purposes, suppose that the reconfigurable building structure 124 is a kitchen pantry and that the item 140 for which the online order has been placed is included within a nonperishable canned foods category. Further suppose that the setup parameters 116 associated with the reconfigurable building structure 124 indicate that upon receipt of nonperishable canned foods at the physical address 142 (which may be, for example, a user's residence), these types of items are in all (or nearly all instances) placed into the kitchen pantry for storage. Thus, in this specific example, receiving the order data 136 for the item 140 that is included within the nonperishable canned foods category may serve as the indication that the item 140 is to be physically moved into the reconfigurable building structure 124.

Upon identifying the particular item 140 for which the order has been placed, the building structure reconfiguration service 102 may then determine corresponding item dimension data 120 that defines one or more physical dimensions of the particular item 140. For example, the building structure reconfiguration service 102 may analyze the order data 136 to identify product specifications that include the one or more physical dimensions of the particular item 140. Based on the item dimension data 120, the building structure reconfiguration service 102 may utilize the configuration data 104 to determine a particular physical configuration of the reconfigurable building structure 124 that is suitable for accommodating physical movement of the particular item 140 into a portion of the reconfigurable building structure 124. Continuing with the example where the reconfigurable building structure 124 is a kitchen pantry, the building structure reconfiguration service 102 may determine a particular physical configuration of the kitchen pantry in which a particular shelf has a height that is large enough for the particular item 140 to be physically placed onto the particular shelf for storage.

Then, once the particular physical configuration is determined, the building structure reconfiguration service 102 may transmit a configuration instruction 144 to the controller 126 to cause actuation of at least some of the movable physical elements 128 to change the relative positions of the various surfaces of the reconfigurable building structure 124. In particular, one or more of the movable elements 128 (e.g., shelves, walls, etc.) may be actuated in a particular manner so as to modulate the reconfigurable building structure 124 into a particular physical configuration that is suitable for accommodating physical movement of the particular item 140 into the portion (e.g., the particular shelf of the kitchen pantry) of the reconfigurable building structure 124. In the specifically illustrated but nonlimiting example, the configuration instruction 144 causes the second movable element 128(2) to be actuated upwards from an initial height of $H_0$ that is not high enough for the particular item 140 to fit to an appropriate height of $H_1$ that is high enough for the particular item 140 to fit. In this way, upon the particular item 140 being delivered to the physical address 142, the building structure reconfiguration service 102 may cause the reconfigurable building structure 124 to change into a suitable physical configuration for the particular item 140 to be stacked into the reconfigurable building structure 124 for storage purposes.

In some embodiments, the building structure reconfiguration service 102 may monitor delivery tracking data 112 associated with a delivery of the particular item 140. For example, the building structure reconfiguration service 102 may analyze the order data 136 to identify a parcel tracking number that is usable to monitor real-time tracking updates associated with delivery of the particular item 140 to the physical address 142. In this way, the building structure reconfiguration service 102 determine when the particular item 140 is going to be delivered to the physical address 142 and may transmit the configuration instruction 144 to the controller 126 prior to the particular item 140 being delivered. In this way, upon delivery of the particular item 140, the reconfigurable building structure 124 may have already been caused to enter the suitable physical configuration so that the particular item 140 can immediately be moved into the reconfigurable building structure 124.

Figure 2A:
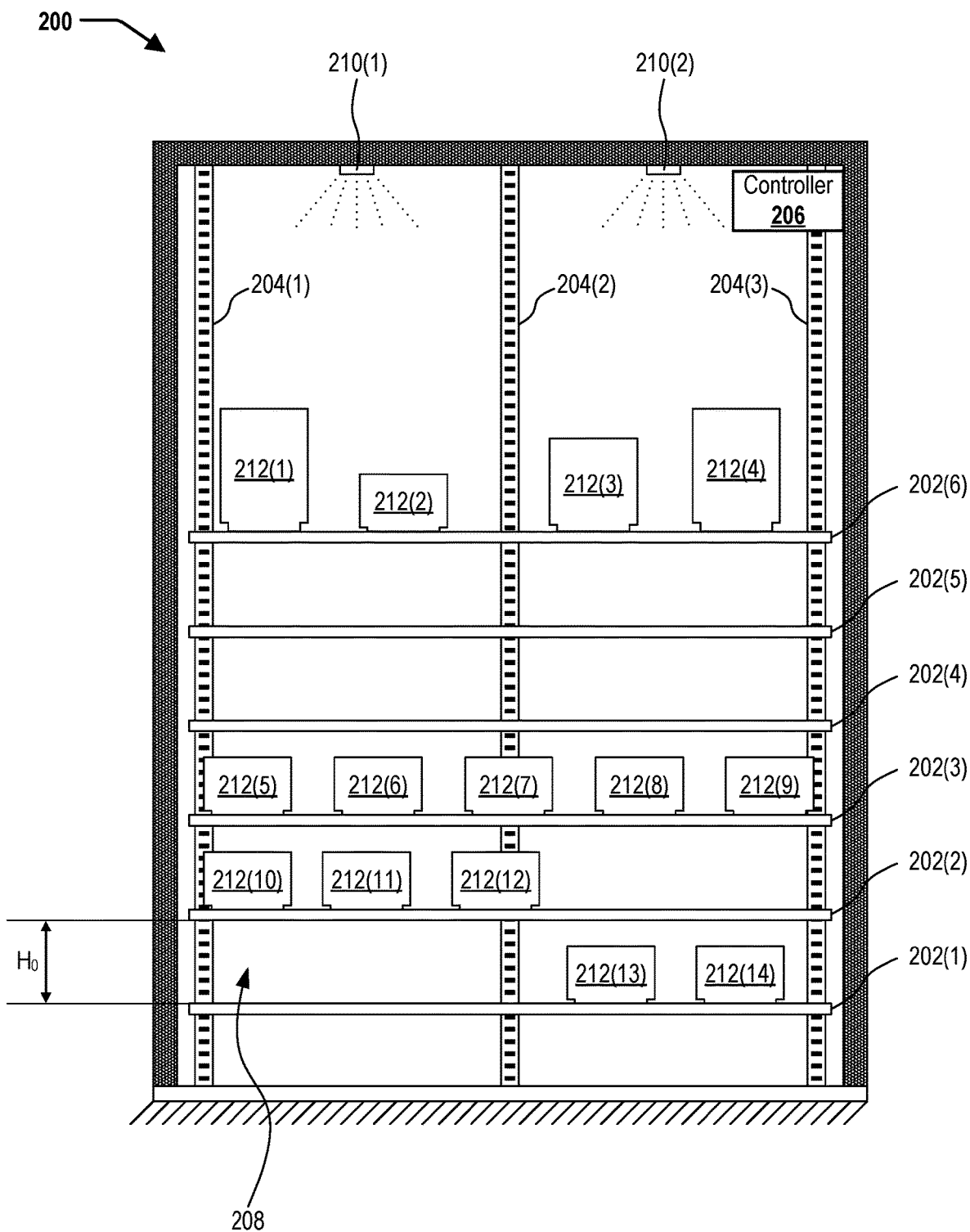
FIG. 2A illustrates an exemplary reconfigurable building structure that includes a plurality of movable elements that can be actuated into various physical positions to accommodate for physical dimensions of items.

Turning now to FIG. 2A, illustrated is an exemplary reconfigurable building structure 200 that includes a plurality of movable elements 202 that can be actuated into various physical positions to accommodate for physical dimensions of items. More specifically, the reconfigurable building structure 200 includes six movable elements 202 that are each configured to be independently actuated along a set of tracks 204. Here, a first movable element is labeled 202(1), a second movable element is labeled 202(2), and so on. Also, a first track is labeled 204(1), a second track is labeled 204(2), and so on. With respect to the movable elements 202 being independently actuated, each individual movable element 202 can be raised and/or lowered along the set of tracks 204 independently of the other movable elements 202. The reconfigurable building structure 200 may also include a controller 206 for causing controlled movements of the movable elements 202. For example, the controller 206 may activate individual actuators to cause individual ones of the movable elements 202 to be raised and/or lowered along the tracks 204.

In the illustrated embodiment, individual ones of the movable elements 202 are individual shelfs upon which one or more items 212 be stored within the reconfigurable building structure 200. For example, the reconfigurable building structure 200 may be in the form of a bookshelf, a kitchen pantry, or any other type of shelving unit. It will be appreciated that the height of a particular shelf-space (i.e., usable volume between shelves) will be defined by a distance between a top surface of one shelf and a bottom surface of another adjacent shelf. For example, an initial height $H_0$ of a shelf-space 208 is defined by a top surface of the first shelf 202(1) and a bottom surface of the second shelf 202(2) that is directly above the first shelf 202(1).

In some embodiments, the controller 206 may be communicatively coupled to one or more sensors 210 to monitor conditions and/or common uses associated with the reconfigurable building structure 200. The sensors 210 may include, but are not limited to, cameras, computer vision sensors, light-gate type sensors, Light Detection and Ranging (LiDAR) sensors, and/or any other type of sensor suitable for detecting various relevant current conditions and/or common uses associated with the reconfigurable building structure 200.

As a specific example of monitoring current conditions of the reconfigurable building structure 200, a first sensor 210(1) may be a Light Detection and Ranging (LiDAR) sensor that is directed toward the inside of the reconfigurable building structure 200 to continuously and/or periodically detect physical dimensions of items that are currently within the various portions of the reconfigurable building structure 200. Sensor data that is generated by the first sensor 210(1) may be analyzed by the controller 206 to identify physical dimensions of one or more existing items 212 that are already within the reconfigurable building structure 200. For example, the controller 206 may analyze the sensor data generated by the first sensor 210(1) to determine specific physical dimensions for each of the first existing item 212(1) through the fourteenth existing item 212(14). Additionally, or alternatively, the sensor data that is generated by the first sensor 210(1) may be analyzed by the controller 206 to identify a current physical arrangement of the one or more existing items 212 within the reconfigurable building structure 200. In the illustrated scenario, for example, the controller 206 may identify that each of the first existing item 212(1) through the fourth existing item 212(4) are currently being stored on the sixth movable element 202(6), that each of the fifth existing item 212(5) through the ninth existing item 212(9) are currently being stored on the third movable element 202(3), and so on. The controller 206 may further identify that each of the fifth movable element 202(5) and the fourth movable element 202(4) do not currently have any items being stored thereon. As described below in relation to FIG. 2B, a determination as to whether an identified event warrants modulating the reconfigurable building structure 200 into a different physical configuration (and/or what that physical configuration should be) may be based at least in part on the current conditions of the reconfigurable building structure 200—as detected by a sensor 210.

As a specific example of monitoring common use cases associated with the reconfigurable building structure 200, a second sensor 210(2) may be a camera that periodically generates images of how the reconfigurable building structure 200 is being used. For example, images may be captured by the second sensor 210(2) and analyzed by the controller 206 and/or the configuration selection engine 114 (as discussed in relation to FIG. 1) to identify the specific types and/or categories of items that are being stored on the various movable elements 202 of the favorable building structure 200. Then, based on this analysis, the item category data 118 may be updated to include definitions for specific types and/or categories of items that are likely to be stored within the reconfigurable building structure 200 and/or on specific movable elements 202 thereof. Additionally, or alternatively, the item category data 118 to be updated to include definitions for specific types and/or categories of items that are unlikely to be stored within the reconfigurable building structure 200 and/or on specific movable elements 202 thereof. As described below in relation to FIG. 2B, the item category data 118 that is been updated based on the sensor data (e.g. images) generated by the second sensor 210(2) may be used to determine whether an identified event warrants modulating the reconfigurable building structure 200 into a different physical configuration.

Figure 2B:
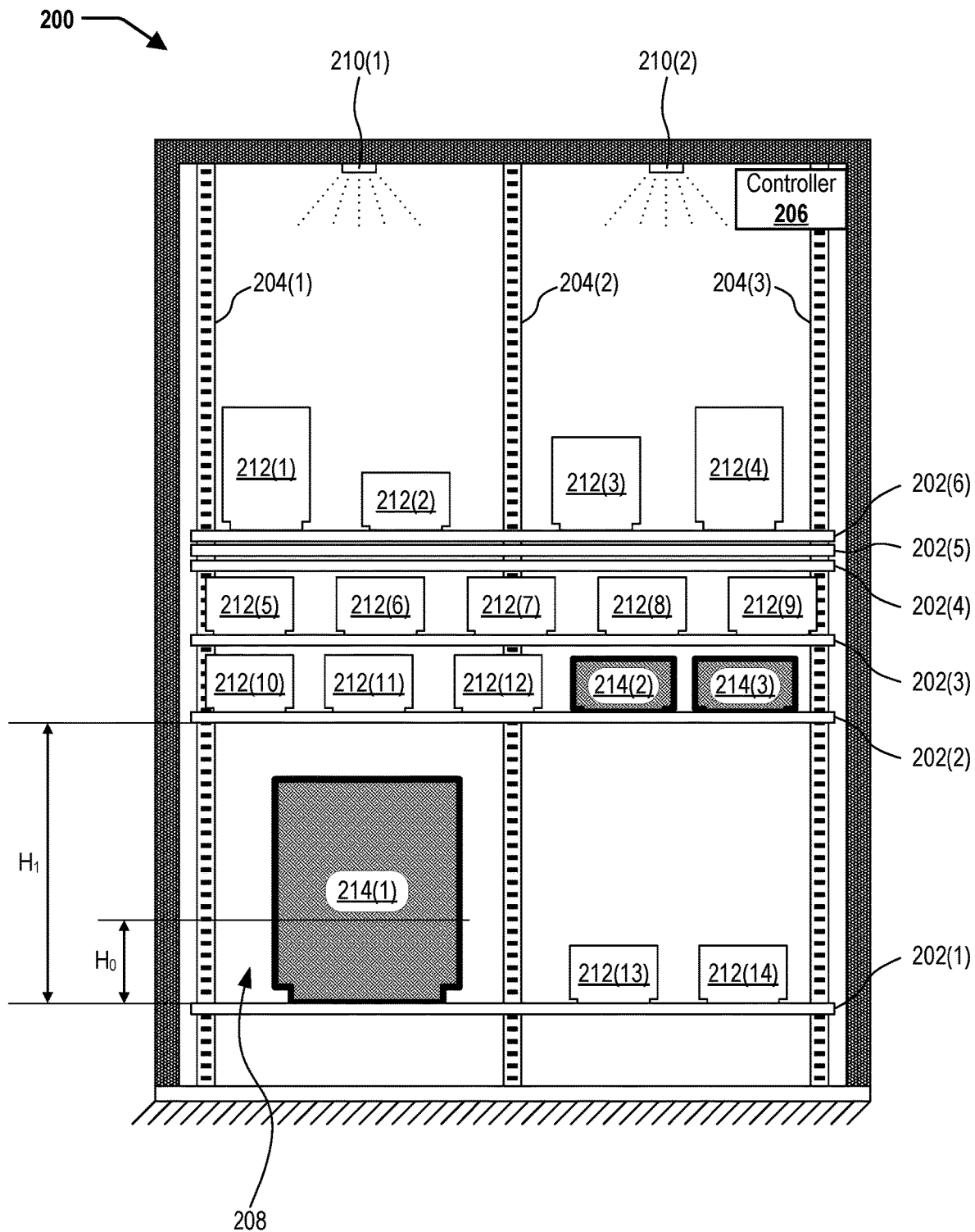
FIG. 2B illustrates the exemplary reconfigurable building structure of FIG. 2A after having been modulated into a different physical configuration than that shown in FIG. 2A for the specific purpose of accommodating physical dimensions of a particular item.

FIG. 2B illustrates the exemplary reconfigurable building structure 200 of FIG. 2A after having been modulated into a different physical configuration than that shown in FIG. 2A. More specifically, FIG. 2B illustrates a physical configuration of the exemplary reconfigurable building structure 200 in which each of the second movable element 202(2) through the fifth movable element 202(5) have been actuated upwards along the tracks 204 so as to increase the height of the shelf-space 208 from the initial height $H_0$ that is shown in FIG. 2A to a relatively greater height of $H_1$.

As described above, the reconfigurable building structure 200 being modulated into the different physical configuration may be triggered based on an indication that one or more specific items 214 are going to be moved into the reconfigurable building structure 200. For example, as described in relation to FIG. 1, order data 136 may be received that identifies one or more specific items 214 that have been ordered for delivery to a physical address 142 associated with the reconfigurable building structure 200. Upon receipt of the order data 136, one or more system components (e.g., the building structure reconfiguration service 102) may determine whether the specific items 214 that had been ordered are of a type and/or class of items that are presumed to be stored within the reconfigurable building structure 200. For example, the system component(s) may analyze the order data 136 to identify the types and/or classes of the specific items 214 that have been ordered and may then compare these identified types and/or classes to the item category data 118.

Then, if it is determined that the specific items 214 are destined for storage within the reconfigurable building structure 200, the system component(s) may analyze the current conditions of the reconfigurable building structure 200 to determine whether the order for the specific items 214 is a sufficient cause for modulating a physical configuration of the reconfigurable building structure 200. To illustrate this point, FIG. 2B shows that a first specific item 214(1) is too tall to have fit within the shelf-space 208 when this shelf-space had the initial height of $H_0$—as shown in FIG. 2A. However, as shown in FIG. 2B, the first specific item 214(1) comfortably fits within the shelf-space 208 after each of the second movable element 202(2) through the fifth movable element 202(5) have been actuated upwards along the set of tracks 204 to increase the height of the shelf-space 208 to the relatively greater height of $H_1$.

Figure 3A:
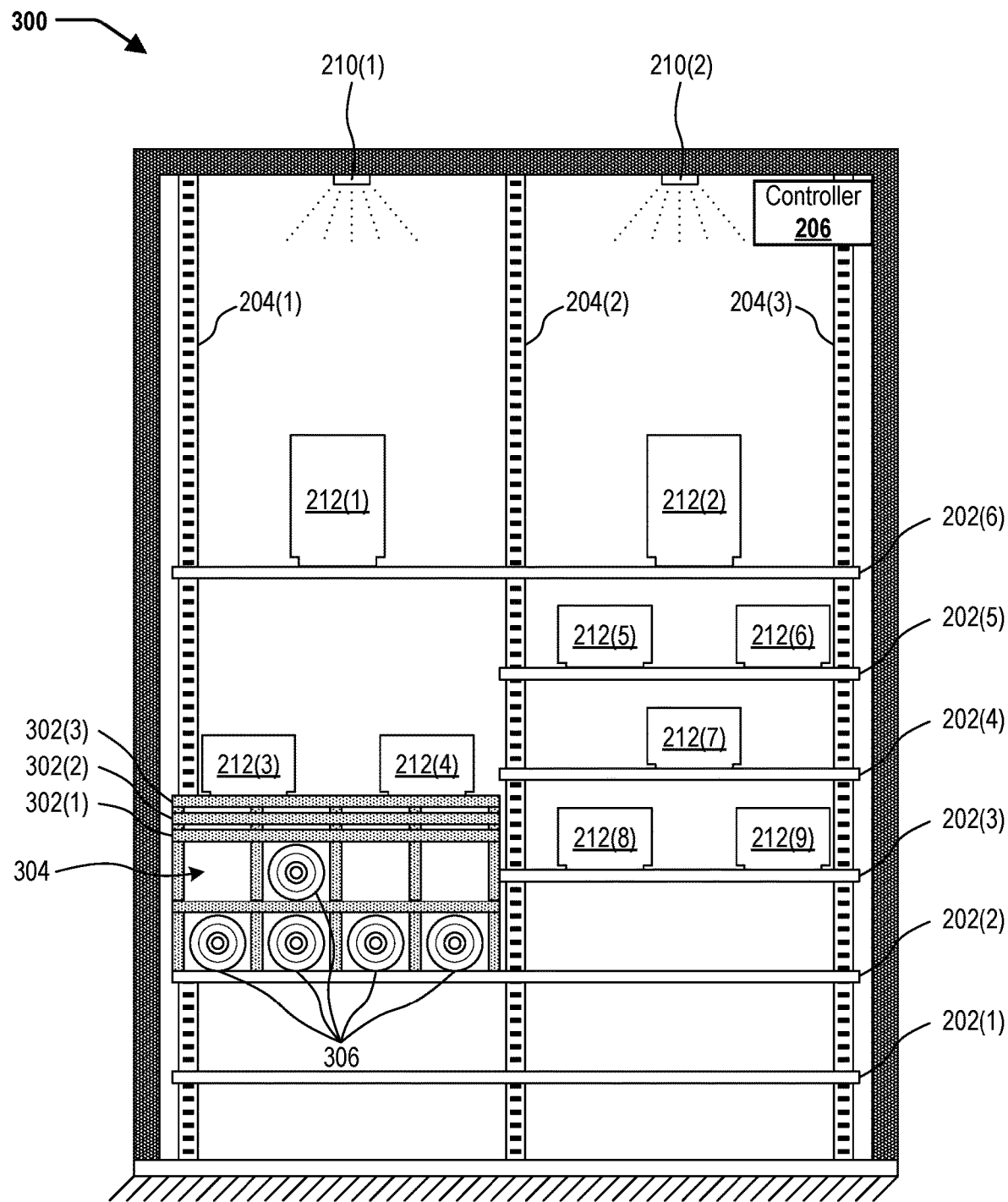
FIG. 3A illustrates an exemplary reconfigurable building structure that includes one or more movable elements that can be actuated to form one or more storage compartments.

Turning now to FIG. 3A, illustrated is an exemplary reconfigurable building structure 300 that includes one or more movable elements 302 that can be actuated to form one or more storage compartments 304. In the illustrated example, the one or more movable elements 302 have been actuated into a particular physical configuration such that eight individual storage compartments 304 are formed. In FIG. 3A, five individual ones of these eight storage compartments 304 are shown as being currently used to store an individual item 306, where's the remaining three storage compartments remain empty.

In some embodiments, the setup parameters 116 may indicate a particular type and/or category of item that is to be stored within the storage compartments 304. As a specific but nonlimiting example, the setup parameters 116 may indicate that the storage compartments 304 are to be used for storing wine bottles. Consistent with this specific example, FIG. 3A shows five individual wine bottles each being stored within an individual one of the eight storage compartments 304 that are formed in the illustrated physical configuration. In the specific scenario illustrated in FIG. 3A, since there are three empty storage compartments 304 it should be appreciated that three additional items of the particular type indicated in the setup parameters 116 (e.g., wine bottles) can be properly stored within the reconfigurable building structure 300 without causing any change to its physical configuration. Thus, in the event that order data 136 is received indicating that an order has been placed that includes three additional wine bottles, a determination may be made that this particular order does not warrant causing any actuation of the one or more movable elements 302. In contrast, in the event that an order has been placed for more than three additional wine bottles, an alternate determination may be made that this particular order does warrant causing actuation of one or more movable elements 302 to expose additional storage compartments 304. It should also be appreciated that as described above one or more sensors may be utilized to determine current conditions of the reconfigurable building structure 300 including, but not limited to, how many items are currently being stored within the currently exposed storage compartments 304. For example, one or more of the sensors 210 may be utilized to determine how many wine bottles are currently being stored within the currently formed storage compartments 304.

Figure 3B:
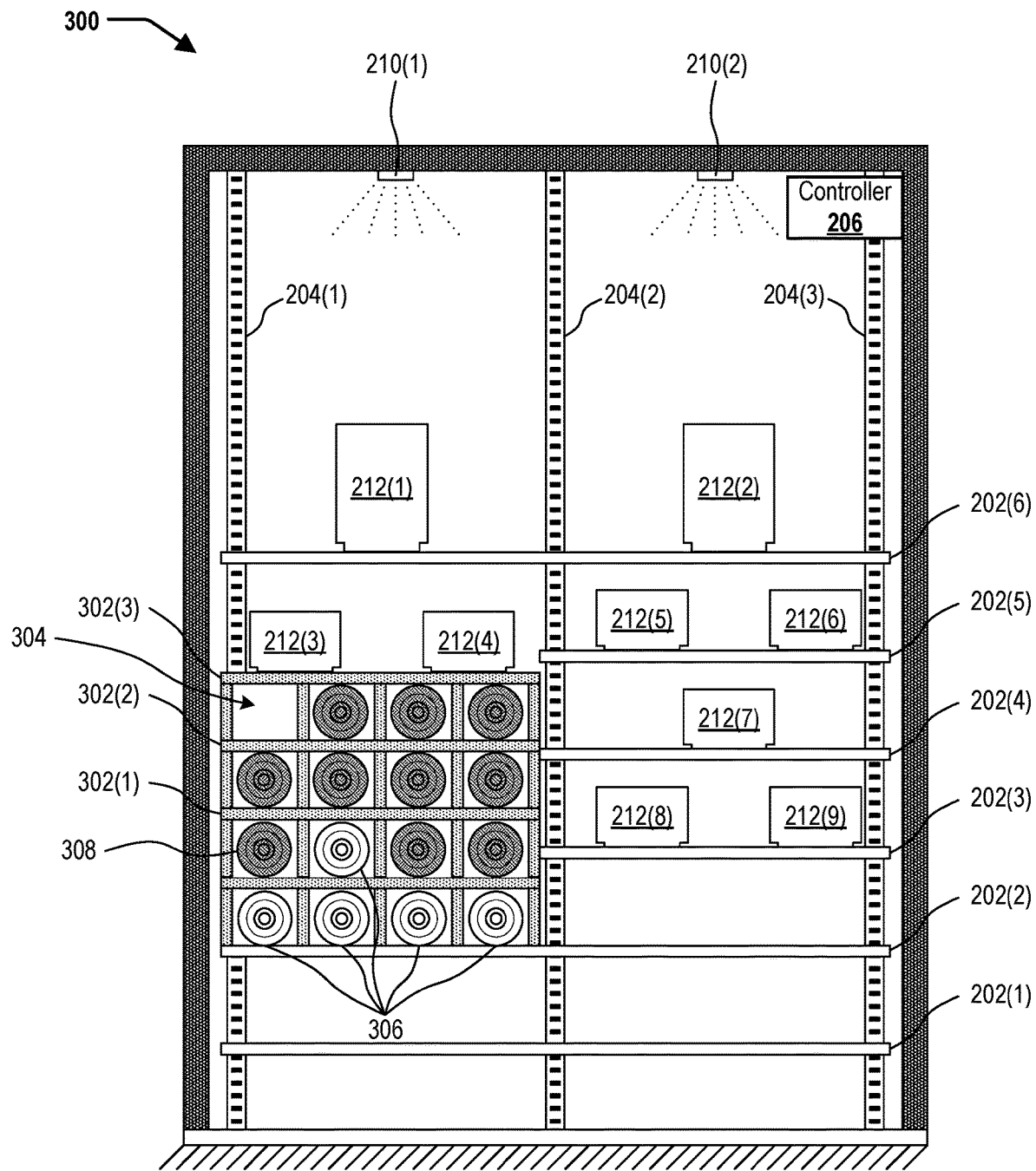
FIG. 3B illustrates the exemplary reconfigurable building structure of FIG. 3A after one or more of the movable elements have been actuated to form one or more additional storage compartments.

FIG. 3B illustrates the exemplary reconfigurable building structure 300 of FIG. 3A after one or more of the movable elements 302 have been actuated to form one or more additional storage compartments 304. More specifically, in FIG. 3B each of the second movable element 302(2) and of the third movable element 302(3) have been moved upwards to form eight additional storage compartments 304. With the addition of the eight storage compartments 304 that have been newly formed via the actuation of the second movable element 302(2) and third movable element 302(3), in FIG. 3B the reconfigurable building structure 300 is shown in a specific physical configuration that includes 16 storage compartments 304.

In some embodiments, a configuration instruction 144 to cause actuation of the reconfigurable building structure 300 from the initial physical configuration shown in FIG. 3A to the new physical configuration shown in FIG. 3B may be generated based on a variety of relevant conditions. For illustrative purposes, presume that the setup parameters 116 indicate that individual ones of the storage compartments 304 are exclusively for storing wine bottles. Under these specific but nonlimiting circumstances, one relevant condition for exposing additional storage compartments 304 as shown in FIG. 3B may be that an indication is received that additional wine bottles are to be delivered to a physical address associated with building structure 300. Further presume that the reconfigurable building structure 300 is outfitted with one or more sensors to continually monitor some relevant information such as, for example, a number of storage compartments 304 that are currently exposed and in use for storage and/or a number of storage compartments that are currently exposed but remain empty. Under these specific but nonlimiting circumstances, another relevant condition for exposing additional storage compartments 304 as shown in FIG. 3B may be that a quantity of additional wine bottles that have been ordered for delivery exceed a number of storage compartments 304 that are currently exposed but remain empty. Thus, it can be appreciated that relevant factors for determining whether a reconfigurable building structure 300 should be modulated into a new physical configuration may include an indication of whether a particular type and/or category of item has been ordered for delivery to a particular physical address and/or a quantity of items of the particular type and/or category that have been ordered.

Figure 4A:
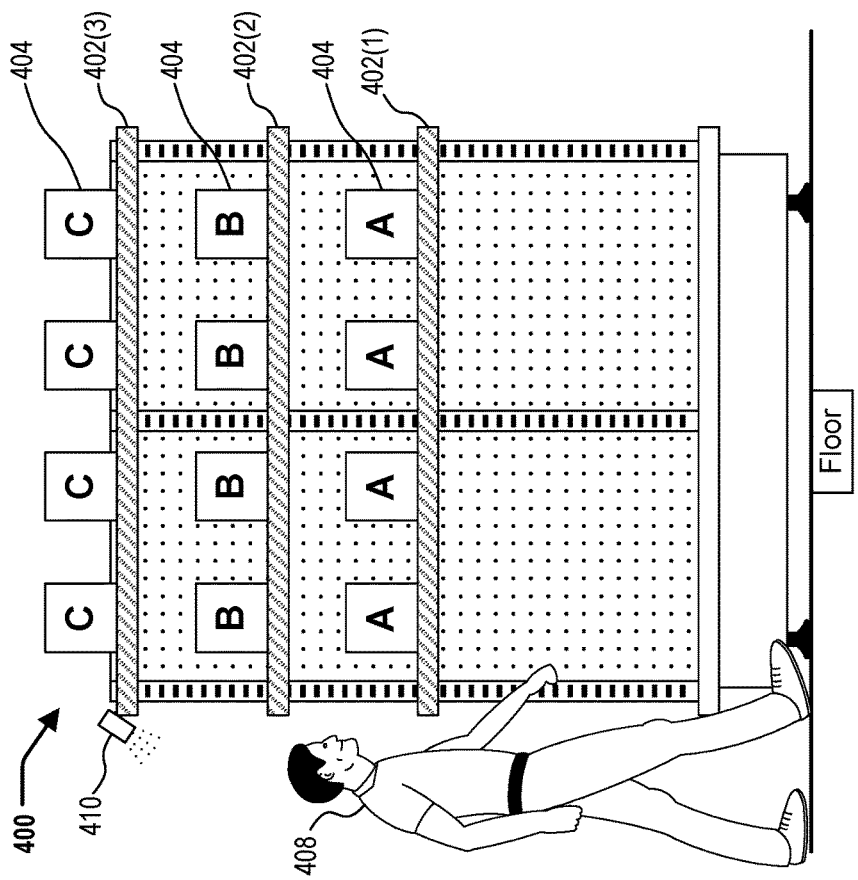
FIG. 4A illustrates an exemplary reconfigurable building structure that includes one or more movable elements that can be actuated in order to adjust a position of one or more items within a particular environment.

Turning now to FIG. 4A, illustrated is an exemplary reconfigurable building structure 400 that includes one or more movable elements 402 that can be actuated in order to adjust a position of one or more items 404 within a particular environment. In the illustrated example, each individual movable element 402 is shown to be supporting a particular type of item 404 that is in some way distinguishable from the other items 404 being supported on the other movable elements 402. More specifically, a first movable element 402(1) is shown to be supporting a first type of item 404 labeled "A," a second movable element 402(2) is shown to be supporting a second type of item 404 labeled "B," and a third movable element 402(3) is shown to be supporting a third type of item 404 labeled "C." In some instances, these different types of items may be similar in classification but different in brand or some other relevant attribute. For example, each different type of item may belong to a carbonated beverage (e.g., soda) classification but may be different brands of carbonated beverage and/or flavor of carbonated beverage. In some instances, these different types of items may differ in classification. For example, the first type of item that is labeled "A" may belong to the carbonated beverage classification whereas the second type of item that is labeled "B" may belong to a fresh squeezed juice classification.

Figure 4B:
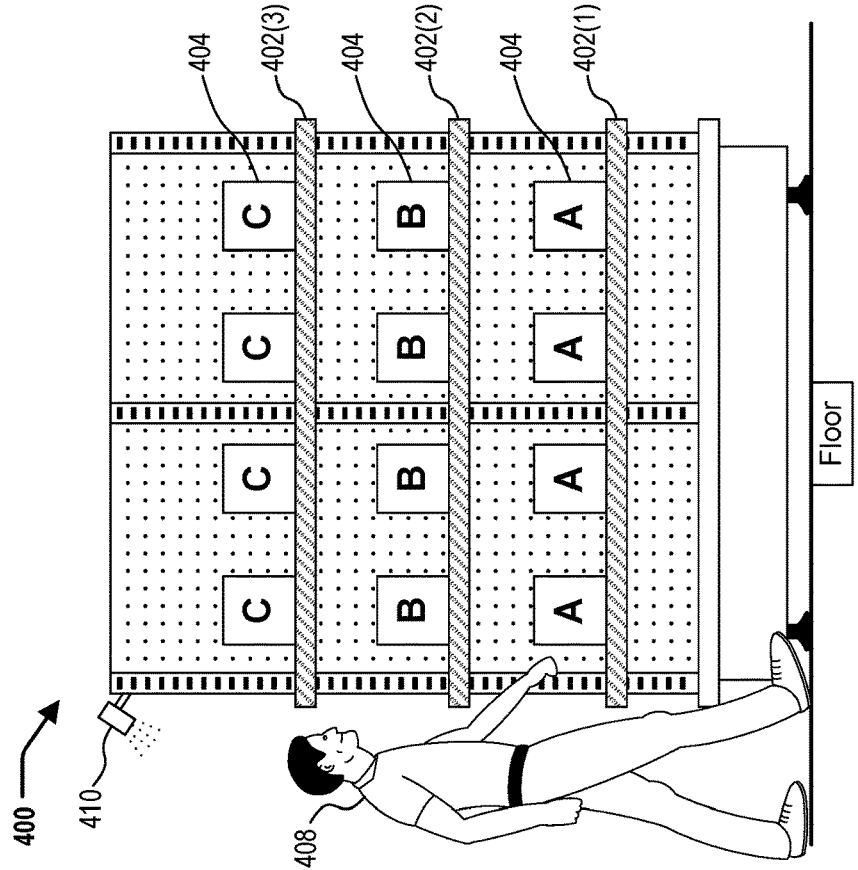
FIG. 4B illustrates the exemplary reconfigurable building structure of FIG. 4A subsequent to at least some of the movable elements having been actuated in order to adjust a position of the items with respect to the particular environment.

Turning now to FIG. 4B, illustrated is the exemplary reconfigurable building structure 400 of FIG. 4A subsequent to at least some of the one or more movable elements 402 having been actuated in order to adjust a position of one or more of the items 404 with respect to the particular environment. In the illustrated example, each individual movable element 402 has been moved upward along one or more tracks 406 in order to raise a height of each of the different types of items. It will be appreciated that the reconfigurable building structure 400 is shown in a suitable form to serve as shelving within a retail facility such as, for example, a grocery store, a hardware store, and so on.

In some embodiments, the one or more movable elements 402 may be actuated to adjust a positioning of the different types of items 404 based on product placement parameters. For example, product placement parameters may define specific times of day during which specific types of items (e.g., brands of items, classifications of items, etc.) are to be maintained by the reconfigurable building structure 400 at different positions. To illustrate this point, suppose that the first type of item that is labeled "A" and the second type of item that is labeled "B" are two competing brands of carbonated soda. In such an instance, it can be appreciated that these two competing brands may likely submit competing bids for "premium" product placement locations within a grocery store facility. Thus, in various implementations, these competing bids may be analyzed or otherwise utilized by the configuration selection engine 114 to determine specific positions to maintain specific types of items. Additionally, or alternatively, these competing bids may be analyzed or otherwise utilized to determine specific times (e.g., specific ranges of times within a single day, specific days within a week, specific weeks within a year, etc.) during which the specific items are to be maintained at specifically determined positions.

In some embodiments, the one or more movable elements 402 may be actuated to adjust a positioning of the different types of items 404 based on data that uniquely corresponds to a particular person. For example, the reconfigurable building structure 400 may be equipped with a sensor 410 to perform one or more user identification techniques to identify when a particular person approaches the reconfigurable building structure 400. For purposes of the present discussion, presume that the reconfigurable building structure 400 is an automated grocery store isle and that the sensor 410 is specifically adapted to perform facial recognition techniques to identify when uniquely identifiable persons approach the reconfigurable building structure 400. Then, upon identifying the particular person, the building structure reconfiguration service 102 described herein may obtain profile data associated with this particular person 408. The profile data may include, for example, general demographic information (e.g., age, gender, etc.), specific user profile information (e.g., shopping lists, purchase history data, etc.), and/or any other types of data suitable for profiling a particular person and/or generalized group of persons.

In this example, in response to identifying that the particular person 408 is approaching the reconfigurable building structure 400 (which in this case is the grocery isle), the profile data associated with the particular person 408 may be retrieved and utilized to determine an appropriate physical configuration into which the reconfigurable building structure 400 should be modulated. To illustrate this point, suppose that the profile data associated with the particular person 408 includes a grocery list which the particular person 408 has compiled prior to entering the grocery store. Then, as the particular person 408 approaches the reconfigurable building structure 400, one or more of the movable elements 402 may be raised and/or lowered for the specific purpose moving particular items 404 that are on the grocery list into conspicuous and/or ergonomic locations with respect to the particular user 408. For example, as the particular person approaches the reconfigurable building structure 400, the first type of item that is labeled "A" may be automatically raised to a suitable height so that the particular person 408 will easily spot the item and can also grab the item without ending over or reaching upwards.

Figure 5:
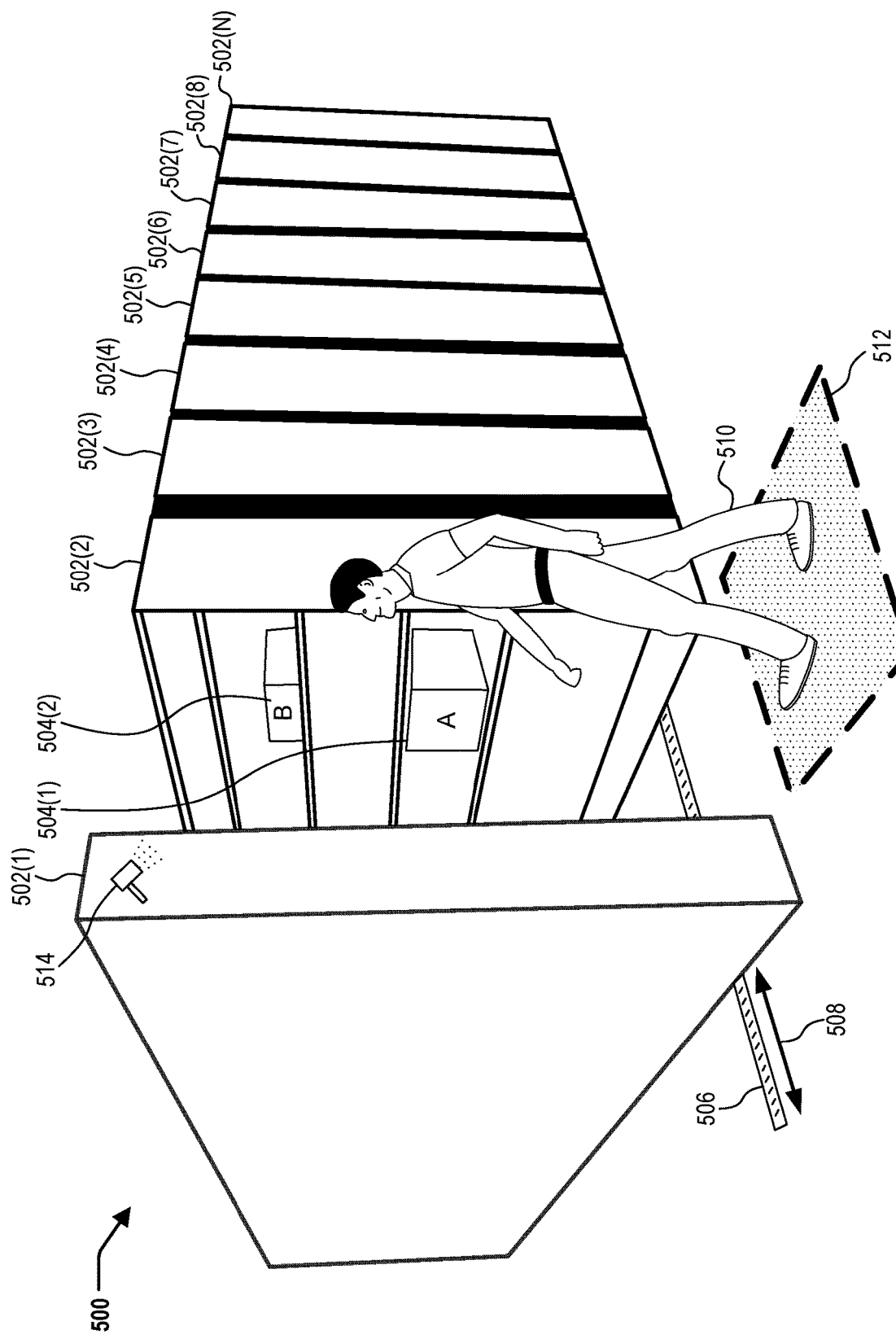
FIG. 5 illustrates an alternate embodiment of an exemplary reconfigurable building structure that includes movable elements that can be actuated in order to adjust a position of one or more items within a building.

Turning now to FIG. 5, illustrated is an alternate embodiment of an exemplary reconfigurable building structure 500 that includes movable elements 502 that can be actuated in order to adjust a position of one or more items 504 within a building (e.g., a fulfillment center). In the illustrated embodiment, the movable elements 502 are configured to be actuated back-and-forth along one or more tracks 506 that extend in a predefined direction as indicated by the arrow 508. As illustrated, the movable elements 502 are illustrated in the form of shelving units. For example, a second movable element 502(2) is illustrated in the form of a shelving unit that is supporting both of a first item 504(1) that is labeled "A" and a second item 504(2) that is labeled "B." It will be appreciated that since the second movable element 502(2) is supporting these items, actuating the second movable element 502(2) along the tracks 506 is an effective way to controllably move the position of these items within the building.

In some embodiments, the building structure reconfiguration service 102 is configured to (e.g., includes computing executable instructions to) modulate current positions of the movable elements 502 to adjust positions of the items 504 with respect to a predefined area 512 of the building. Furthermore, the building structure reconfiguration service 102 may be configured to determine how and when to modulate the current positions of the movable elements 502 based on order data 136. For example, suppose that the person 510 is an employee at the fulfillment center 138 and that the employee is tasked with collecting a set of items 504 that is defined by the order data 136. Further suppose that a first subset of these items 504 are stored within the second movable element 502(2) and a second subset of these items 504 are stored within the eighth movable element 502(8). In such an example, the person 510 may be instructed to stand within the predefined area 512 while the building structure reconfiguration service 102 causes the reconfigurable building structure 500 to become physically configured as illustrated in FIG. 5 where the first movable element 502(1) and the second movable element 502(2) are specifically repositioned to form an opening therebetween. As further illustrated, this opening that is formed between the first movable element 502(1) and the second movable element 502(2) is shown to be positioned in direct alignment with the predetermined area 512. In this way, upon the reconfigurable building structure 500 being physically configured as shown, the person 510 is able to walk a short distance into the opening between the first and second movable elements to retrieve the first subset of items that is stored within the second movable element 504(2).

Then, the building structure reconfiguration service 102 may determine (e.g., via one or more sensors 514) when the person 510 returns to the predefined area 512. Responsive to this determination, the building structure reconfiguration service 102 may again modulate the current positions of the movable elements 502 into a different physical configuration in which a new opening is formed between the seventh movable element 502(7) and the eighth movable element 502(8). Similar to the opening shown in FIG. 5, this new opening between the seventh and eighth movable elements may be positioned in direct alignment with the predetermined area 512 so that the person 510 can walk directly into the newly formed opening from the same predetermined area 512 from which the previously formed opening between the first and second movable elements was formed. In this way, the person 510 is able to retrieve both the first subset of items 504 and the second subset of items 504 with substantially reduced walking requirements as compared to if the person 510 had to walk from a "stationary" opening between the first and second movable elements 502 to another "stationary" opening between the seventh and eight movable elements 502.

Figure 6:
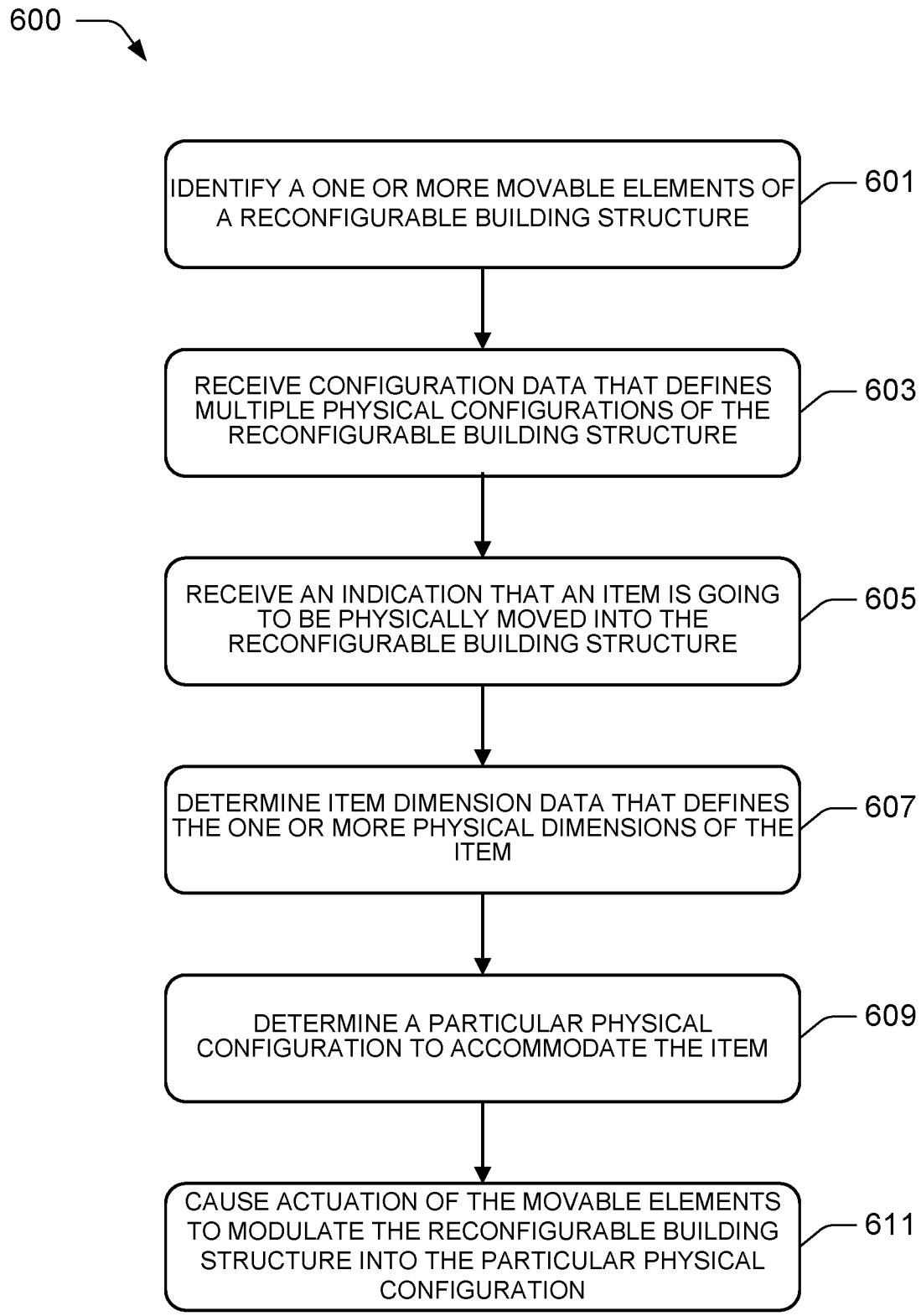
FIG. 6 illustrates an example process that may be performed by a building structure reconfiguration service to automatically modulate (i.e., controllably adjust) a physical configuration of a reconfigurable building structure.

FIG. 6 illustrates an example process 600 that may be performed by the building structure reconfiguration service 102 to automatically modulate (i.e., controllably adjust) a physical configuration of a reconfigurable building structure 124.

At block 601, the building structure reconfiguration service 102 identifies a one or more movable elements of the reconfigurable building structure 124. As described above, the one or more movable elements may define one or more surfaces of the reconfigurable building structure. Furthermore, individual movable elements of the one or more movable elements are configured to be actuated between multiple different positions.

At block 603, the building structure reconfiguration service 102 receives configuration data that defines one or more physical configurations of the reconfigurable building structure. For example, the configuration data may define a first configuration in which a shelf-space of the reconfigurable building structure is a first size and also a second configuration in which this same shelf-space is enlarged to a second size—that is greater than the first size.

At block 605, the building structure reconfiguration service 102 receives an indication that an item is going to be physically moved into the reconfigurable building structure. For example, the indication may correspond to receiving order data that indicates that the item has been ordered for delivery to a physical address associated with the reconfigurable building structure.

At block 607, the building structure reconfiguration service 102 determines item dimension data that defines the one or more physical dimensions of the item. For example, the order data may be analyzed to identify a product ID that uniquely identifies the item. Then, based on this product ID, the building structure reconfiguration service 102 may extract the specific dimensions for the item from a retail catalog or other data source that includes information about the item.

At block 609, the building structure reconfiguration service 102 determines a particular physical configuration to accommodate the item. For example, a particular physical configuration can be identified in which the item will physically fit into a particular portion of the reconfigurable building structure.

At block 611, the building structure reconfiguration service 102 causes actuation of at least some of the plurality of movable elements to modulate the reconfigurable building structure into the particular physical configuration.

Figure 7:
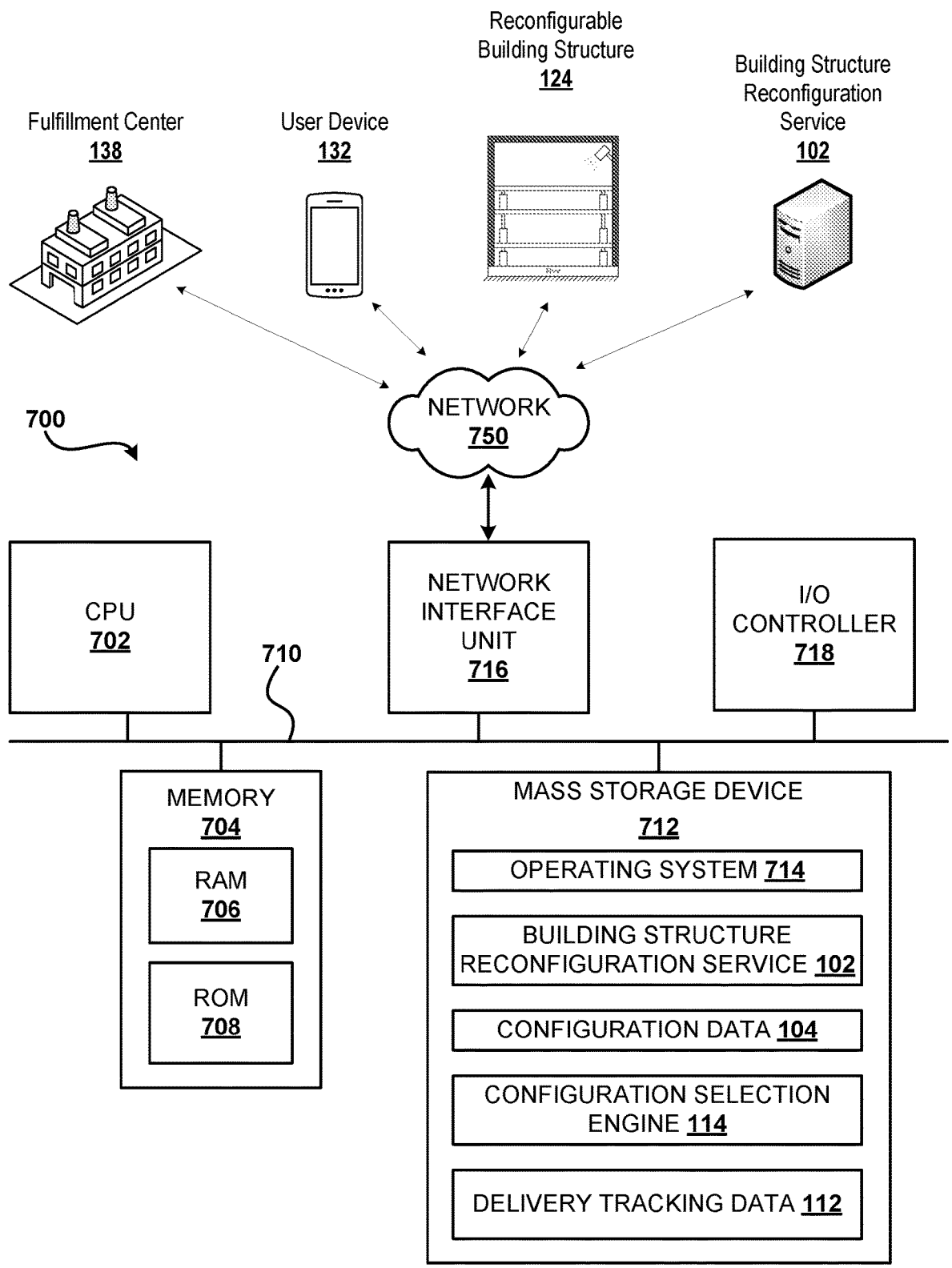
FIG. 7 shows additional details of an example computer architecture for a computer capable of executing the functionalities described herein such as, for example, those described with reference to the reconfigurable building structure and/or the building structure reconfiguration service, or any program components thereof as described herein.

FIG. 7 shows additional details of an example computer architecture for a computer capable of executing the functionalities described herein such as, for example, those described with reference to the reconfigurable building structure 124 and/or the building structure reconfiguration service 102, or any program components thereof as described herein. Thus, the computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. the computer architecture 700 further includes a mass storage device 712 for storing an operating system 714, other data, and one or more application programs. the mass storage device 712 may further include one or more of the building structure reconfiguration service 102, the configuration data 104, the configuration selection engine 114, and/or the delivery tracking data 112.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown in FIG. 7). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable one or more of the Fulfillment Center 138, the User Device 132, the Reconfigurable Building Structure 124, and/or the Building Structure Reconfiguration Service 102 to communicate with one another.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

The techniques disclosed herein are widely applicable to a variety of approaches for automatically modulating a physical configuration of a reconfigurable building structure based on various factors. Numerous aspects of the techniques disclosed herein are described in the specific context of modulating a physical configuration of shelves based on specific dimensions of items that have been ordered to a physical address associated with the reconfigurable building structure. While the presently disclosed techniques are not necessarily limited to such embodiments, an appreciation of various aspects of the techniques disclosed herein is readily gained through a discussion of examples in this specific context of adjusting shelves to "fit" items that are about to be delivered. However, the disclosed techniques are widely applicable numerous other scenarios where it may be desirable to modulate a physical configuration of a building.

As a specific but non-limiting example, the building structure reconfiguration service 102 described herein may be deployed to modulate a physical configuration of one or more building structures that are constructed, in whole or in part, from a plurality of individual robotic elements. To illustrate this point, suppose that a reconfigurable table structure is constructed from a set of one-hundred ("100") individual robotic elements. Further suppose that in a first configuration, a table-top portion of the reconfigurable table structure is made up of fifty ("50") of the individual robotic elements and that four legs of the reconfigurable table structure are, in the aggregate, made up of the remaining fifty ("50") of the individual robotic elements. Thus, if each individual robotic element is a 5-inch cube, then it can be appreciated that the table-top portion of the reconfigurable table structure may be 1250 square inches in the first configuration. Further suppose that at some point in time while the reconfigurable table structure is in this first configuration, an order is placed for a large item that person is likely to sit down to complete. For example, suppose that an order for a large jigsaw puzzle is placed. Under these circumstances, an configuration instruction 144 may be generated to cause the reconfigurable table structure to reconfigure itself from the first configuration into a second configuration in which the table-top portion of the reconfigurable table structure is made up of eighty ("80") of the individual robotic elements and that four legs of the reconfigurable table structure are, in the aggregate, made up of the remaining twenty ("20") of the individual robotic elements. Thus, it can be appreciated that the height of the table-top portion will have been lowered and that the total usable area (e.g., square inches) of the table-top portion will have increased from 1250 square inches to 2000 square inches (e.g., since each cube is made up of six 25 square inch surfaces).

EXAMPLES OF VARIOUS IMPLEMENTATIONS

The present disclosure is made in light of the following clauses:

Example Clause A, a computer-implemented method for actuating a reconfigurable building structure between different physical configurations to accommodate for one or more physical dimensions of an item, the computer-implemented method comprising: identifying at least one movable element that define one or more surfaces of the reconfigurable building structure, wherein individual movable elements of the at least one movable element are configured to be actuated between multiple different positions to modulate the reconfigurable building structure between one or more physical configurations; receiving an indication that the item is to be physically moved into the reconfigurable building structure; determining item dimension data that defines the one or more physical dimensions of the item; based on the item dimension data, determining a particular physical configuration, of the one or more physical configurations of the reconfigurable building structure, that is suitable for accommodating physical movement of the item having the one or more physical dimensions into at least a portion of the reconfigurable building structure; and responsive to the indication, causing actuation of at least some of at least one movable element, from a current physical configuration into the particular physical configuration to accommodate the physical movement of the item into the at least the portion of the reconfigurable building structure.

Example Clause B, the computer-implemented method of Example Clause A, wherein the indication that the item is to be physically moved into the reconfigurable building structure corresponds to receiving order data indicating that an order has been placed for the item and that the item is to be delivered to a physical address associated with the reconfigurable building structure.

Example Clause C, the computer-implemented method of Example Clause B, wherein the indication that the item is to be physically moved into the reconfigurable building structure further corresponds to the item belonging to a particular category of item that is defined in setup parameters for the reconfigurable building structure.

Example Clause D, the computer-implemented method of any one of Example Clauses A through C, further comprising: receiving sensor data that is generated by one or more sensors in association with at least one movable element that define the one or more surfaces of the reconfigurable building structure; and analyzing the sensor data to identify at least one current condition of the reconfigurable building structure, wherein the particular physical configuration is determined based at least in part on the at least one current condition of the reconfigurable building structure.

Example Clause E, the computer-implemented method of Example Clause D, wherein the at least one current condition of the reconfigurable building structure corresponds to at least one of: a quantity of one or more existing items that are currently being stored within the reconfigurable building structure, or physical dimensions of the one or more existing items that are currently being stored within the reconfigurable building structure.

Example Clause F, the computer-implemented method of any one of Example Clauses A through E, wherein at least one movable element includes at least a first shelf and a second shelf that define a shelf-space, and wherein the causing the actuation includes actuating at least one of the first shelf or the second shelf to increase a height of the shelf-space to accommodate a height of the item.

Example Clause G, the computer-implemented method of any one of Example Clauses A through F, wherein the actuation of the at least some of at least one movable element forms one or more storage compartments.

Example Clause H, the computer-implemented method of any one of Example Clauses A through G, wherein individual physical configurations correspond to predefined position combinations of at least one movable element.

Example Clause I, a system for causing actuation of a reconfigurable building structure, the system comprising: one or more processors; and a memory in communication with the one or more processors, the memory having computer-readable instructions stored thereupon that, when executed by the one or more processors, cause the one or more processors to: receive an indication that an item is going to be physically moved into the reconfigurable building structure, the indication received when the reconfigurable building structure is in a first physical configuration; determine item dimension data that defines one or more physical dimensions of the item; analyze, based on the item dimension data, configuration data that corresponds to the reconfigurable building structure to identify a second physical configuration of the reconfigurable building structure that is suitable for accommodating physical movement of the item having the one or more physical dimensions into at least a portion of the reconfigurable building structure; and cause actuation of one or more movable elements, of the reconfigurable building structure, to modulate the reconfigurable building structure from the first physical configuration into the second physical configuration.

Example Clause J, the system of Example Clause I, wherein the indication that the item is going to be physically moved into the reconfigurable building structure corresponds to receiving order data indicating that an order has been placed for the item.

Example Clause K, the system of any one of Example Clauses I through J, wherein the computer-readable instructions are further executable to: analyze the order data to identify an item category that corresponds to the item; and analyze setup parameters that correspond to the reconfigurable building structure to determine whether the item category is associated with the reconfigurable building structure.

Example Clause L, the system of any one of Example Clauses I through K, wherein the at least a portion of the reconfigurable building structure is defined by a distance between a first surface of the one or more movable elements and a second surface of the one or more movable elements, and wherein the actuation of the one or more movable elements results in the distance increasing at least until the item having the one or more physical dimensions fits into the portion of the reconfigurable building structure.

Example Clause M, the system of any one of Example Clauses I through L, wherein the computer-readable instructions are further executable to: receive sensor data that is generated by one or more sensors in association with the reconfigurable building structure; and analyze the sensor data to identify at least one current condition of the reconfigurable building structure, wherein the second physical configuration is determined based at least in part on the at least one current condition of the reconfigurable building structure.

Example Clause N, the system of any one of Example Clauses I through M, wherein the indication that the item is going to be physically moved into the reconfigurable building structure corresponds to receiving order data indicating that an order has been placed for the item.

Example Clause O, the system of any one of Example Clauses I through N, wherein the actuation of the one or more movable elements to modulate the reconfigurable building structure from the first physical configuration into the second physical configuration forms at least one storage compartment that is present in the second physical configuration and is absent from the first configuration.

Example Clause P, the system of any one of Example Clauses I through O, wherein the computer-readable instructions are further executable to: receive delivery tracking data associated with a delivery of the item to a physical address associated with the reconfigurable building structure; and generating a configuration instruction to cause the reconfigurable building structure to modulate from the first physical configuration into the second physical configuration prior to the delivery.

Example Clause Q, a computer-implemented method, comprising: identifying at least one movable element of a reconfigurable building structure, wherein individual movable elements of the at least one movable element are configured to be actuated between multiple different positions; receiving configuration data that defines one or more physical configurations of the reconfigurable building structure; receiving order data that identifies one or more specific items that are being stored within the reconfigurable building structure; based on the order data, determining a particular physical configuration of the one or more physical configurations of the reconfigurable building structure, wherein the particular physical configuration is designed to adjust a position of a particular item of the one or more specific items with respect to a physical environment; and causing actuation of at least some of the at least one movable element, from a current physical configuration into the particular physical configuration to accommodate to adjust the position of the particular item of the one or more specific items with respect to the physical environment.

Example Clause R, the computer-implemented method of Example Clause Q, wherein the at least one movable element that are configured to be actuated between the multiple different positions are shelves that are supporting the one or more specific items.

Example Clause S, the computer-implemented method of any one of Example Clauses Q through R, further comprising receiving product placement parameters associated with the one or more specific items that are being stored within the reconfigurable building structure, and wherein the determining the particular physical configuration is further based on the placement parameters.

Example Clause T, the computer-implemented method of any one of Example Clauses Q through S, further comprising: identifying a particular person based on sensor data that is received in association with the reconfigurable building structure; and determining the particular physical configuration based on profile data associated with the particular person.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for actuating a reconfigurable building structure between different physical configurations, the computer-implemented method comprising:
    identifying a parameter that controls storage of an item in the reconfigurable building structure;
    determining a particular physical configuration of the reconfigurable building structure based on the parameter and the item in the reconfigurable building structure; and
    causing actuation of at least one movable element from a current physical configuration into the particular physical configuration.

2. The computer-implemented method of claim 1, wherein the parameter indicates one or more preferred physical configurations for the reconfigurable building structure and wherein determining of the particular physical configuration of the reconfigurable building structure comprises selecting the particular physical configuration from the one or more preferred physical configurations.

3. The computer-implemented method of claim 1, wherein the parameter includes a specific condition under which the reconfigurable building structure is to modulate into one or more specific physical configurations.

4. The computer-implemented method of claim 1, wherein the parameter describes one or more attributes of the item, the one or more attributes including at least one of a type, a brand, or a category of the item.

5. The computer-implemented method of claim 1, wherein the parameter is defined by data corresponding to the item received by the reconfigurable building structure.

6. The computer-implemented method of claim 1, wherein the parameter is defined by an end user of the reconfigurable building structure.

7. The computer-implemented method of claim 1, wherein the parameter is defined by a manufacturer of the reconfigurable building structure.

8. The computer-implemented method of claim 1, wherein the parameter defines when to cause actuation of the at least one movable element from the current physical configuration into the particular physical configuration.

9. The computer-implemented method of claim 1, wherein the parameter defines specific times during which the item is to be maintained at a particular storage location in the reconfigurable building structure.

10. A system for causing actuation of a reconfigurable building structure, the system comprising:
    one or more processors; and
    a memory in communication with the one or more processors, the memory having computer-readable instructions stored thereupon that, when executed by the one or more processors, cause the one or more processors to:
        identify a parameter that controls storage of an item of the reconfigurable building structure;
        determine a particular physical configuration of the reconfigurable building structure based on the parameter and the item; and
        cause actuation of at least one movable element from a current physical configuration into the particular physical configuration.

11. The system of claim 10, wherein the parameter indicates one or more preferred physical configurations for the reconfigurable building structure and wherein determining the particular physical configuration of the reconfigurable building structure comprises selecting the particular physical configuration from the one or more preferred physical configurations.

12. The system of claim 10, wherein the actuation of the at least one movable element from the current physical configuration into the particular physical configuration is caused prior to storing the item in the reconfigurable building structure.

13. The system of claim 10, wherein the parameter includes a specific condition under which the reconfigurable building structure is to modulate into one or more specific physical configurations, the computer-readable instructions further comprising:
    determine that storing the item of the reconfigurable building structure in the current physical configuration would result in the specific condition; and
    determine the particular physical configuration of the reconfigurable building structure from the one or more specific physical configurations based on the specific condition.

14. The system of claim 10, wherein the parameter is defined based on a type of the item.

15. The system of claim 10, wherein the parameter is defined based on a brand of the item.

16. The system of claim 10, wherein the parameter is defined based on a category of the item.

17. The system of claim 10, wherein the parameter is defined by at least one of:
   data corresponding to the item received by the reconfigurable building structure;
   an end user of the reconfigurable building structure; or
   a manufacturer of the reconfigurable building structure.

18. The system of claim 10, wherein the parameter defines when to cause actuation of the at least one movable element from the current physical configuration into the particular physical configuration.

19. One or more computer-readable storage media comprising instructions stored thereon that, responsive to execution by a processor, causes the processor to perform operations comprising:
   identifying a parameter that controls storage of an item in a reconfigurable building structure;
   determining a particular physical configuration of the reconfigurable building structure based on the parameter and the item in the reconfigurable building structure; and
   causing actuation of at least one movable element from a current physical configuration into the particular physical configuration.

20. The one or more computer-readable storage media of claim 19, wherein the parameter is based on data that corresponds to a particular person in association with the reconfigurable building structure.

* * * * *